United States Patent [19]

Anderson et al.

[11] 3,848,390

[45] Nov. 19, 1974

[54] WINDOW FASTENER

[75] Inventors: William S. Anderson, Berwyn, Pa.; Roman Gerken, Delran, N.J.

[73] Assignee: United States Banknote Corporation, New York, N.Y.

[22] Filed: Jan. 12, 1973

[21] Appl. No.: 322,943

[52] U.S. Cl. .............................. 52/758 H, 403/401
[51] Int. Cl. .............................................. E06b 1/14
[58] Field of Search .......... 52/753 C, 753 D, 758 H, 52/656, 475; 403/401

[56] References Cited
UNITED STATES PATENTS

| | | | |
|---|---|---|---|
| 2,206,493 | 7/1940 | Whatling | 52/753 D |
| 2,538,138 | 1/1951 | Webster | 403/401 X |
| 2,994,414 | 8/1961 | Gebhard | 403/401 X |
| 3,585,770 | 6/1971 | Maizler | 52/758 H |

FOREIGN PATENTS OR APPLICATIONS

| | | | |
|---|---|---|---|
| 1,349,304 | 12/1963 | France | 52/475 |
| 108,879 | 6/1925 | Switzerland | 403/401 |

Primary Examiner—Werner H. Schroeder
Attorney, Agent, or Firm—Cushman, Darby & Cushman

[57] ABSTRACT

A simple, inexpensive but effective fastener combination for fastening hollow rails to form a corner, for example, for a door or window with an L-shaped bottom spring member disposed within the hollow rails with a leg extending along the inner wall of each rail and having a threaded aperture at the apex thereof, a top spring member with legs extending along the legs of the bottom spring and a tab in each leg for engaging a slot in the exterior wall of one of the rails and a set screw engaging the threads of the bottom spring and exerting a force on the apex of the top spring for causing the tabs engaging the respective slots to pull the rails toward each other.

3 Claims, 5 Drawing Figures

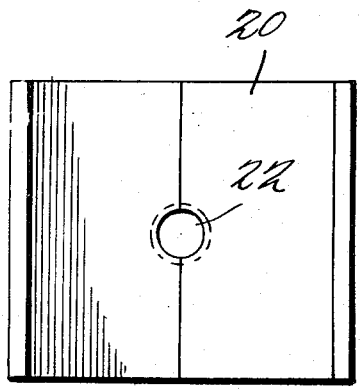
Fig.1
Fig.2
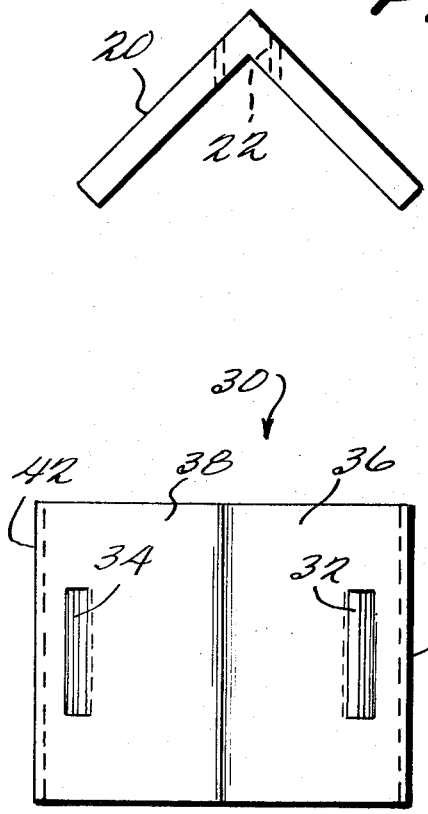
Fig.3
Fig.4
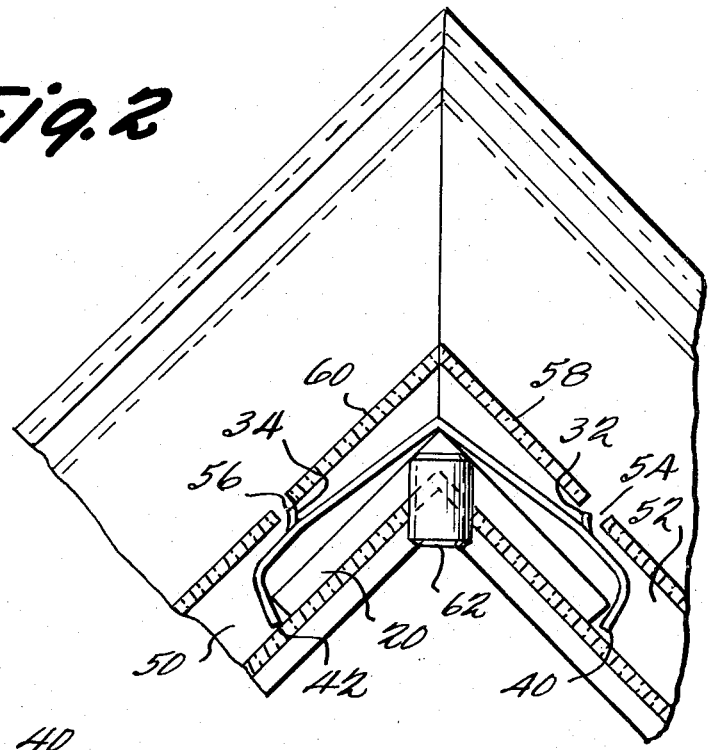
Fig.5

WINDOW FASTENER

BRIEF DESCRIPTION OF THE PRIOR ART AND SUMMARY OF THE INVENTION

The invention relates to a simple, inexpensive and effective fastener combination for fastening hollow rails to form a corner, e.g. for a door or window.

Storm doors, storm windows and the like are frequently formed with hollow framing members such as extruded aluminum sections. It is convenient and conventional to join a number of such framing sections or rails at mitred corner joints forming a right angle. Many different types of corner fastening devices such as corner keys, gussets and the like have been used in that regard. Such devices have considerable number of drawbacks. Frequently they are difficult to install and do not always maintain the structural rigidity of the corner, particularly after many years.

The patents to Gebhard U.S. Pat. Nos. 2,994,414 and 3,388,936 describe improved window fasteners for forming a corner construction. According to the arrangement illustrated, e.g., in the Gebhard U.S. Pat. No. 2,994,414 patent, the fastener includes a spring member with two arms extending outward from an apex, each arm terminating in a hook which engages a slot in an outer wall of one of the two respective rails forming the corner. A threaded aligning block has two separated feet, respectively engaging the inner surfaces of the two interior walls of the respective frames, with those walls forming at the interior intersection an aperture through which a threaded screw member can be inserted. To assemble the fastener, the screw member is manually rotated and passed through the aligning block to engage the spring at its apex, exerting a force on that spring which causes the two hook ends to draw the corners together in a tight embrace.

This fastener, while effective in fastening together rails of this type has a number of considerable drawbacks. One of the chief disadvantages is that the three components of the combination cannot be manufactured simply and economically enough for the combination to be competitive with other, albeit less satisfactory, fasteners. The need for a special aligning block and a special type of screw proves a tremendous economic disadvantage.

The present invention relates to a simple and inexpensive fastener which is just as effective as the Gebhard fastener but which is constructed much more simply and is economically competitive with other constructions which are much less satisfactory in operation and much harder to install. This fastener combination is comprised of a bottom, L-shaped spring member which takes the place of the aligning block of the Gebhard fastener and which has two legs which extend outward from an apex having a threaded aperture and which contact and engage the inner surfaces of the interior walls of each of the two respective rails. The combination further includes a top spring having two legs likewise extending outward from an apex and each having a tab at a distance from the top spring apex which engages a slot in the exterior wall of the two respective rails. The legs of the top spring further terminate in curved or hooked portions which engage the ends of the L-shaped member respectively. The combination is completed by a conventional set screw which can be manually rotated and which threads through the aperture in the L-shaped spring member to engage the apex of the top spring, causing the two tabs in the respective slots of the exterior walls of the two rails to pull the rails together into a firm embrace. By using a set screw which engages rather than goes through the top spring, the top spring can be made considerably cheaper and of less durable materials.

Many other objects and purposes of the invention will become clear from the following detailed description of the drawings.

BRIEF DESCRIPTION OF THE DRAWINGS

FIG. 1 illustrates a top view of the L-shaped bottom spring;

FIG. 2 shows a side view of the spring of FIG. 1;

FIG. 3 shows a top view of the top spring which engages the exterior walls of the two rails;

FIG. 4 shows a side view of the top spring of FIG. 3;

FIG. 5 shows a cut-away view of the fastener combination of this invention installed within the hollow interior between two rails forming a corner.

DETAILED DESCRIPTION OF THE DRAWINGS

Reference is now made to FIGS. 1 and 2 which illustrate respectively a top and side view of the bottom L-shaped spring member 20 which is provided with a threaded aperture 22 at its apex for receiving a set screw as discussed below. Spring 20 can be constructed of any suitable material and extruded aluminum angle ⅛ inch in thickness has been found satisfactory.

FIGS. 3 and 4 illustrate the top spring 30 which is provided with tabs 32 and 34 extending upwardly from legs 36 and 38 respectively, which terminate in hooks or curved portions 40 and 42. Spring 30 can likewise be constructed of any suitable material.

FIG. 5 illustrates the combination fastener of this invention as it is installed to fasten together two rails 50 and 52 which intersect to form a corner at roughly 90°. As can be seen, tabs 34 and 32 extend into slots 54 and 56 of the exterior walls 58 and 60, respectively, of rails 50 and 52. Hook shaped ends 42 and 40 engage the ends of L-shaped spring member 20. A conventional set screw 62 passes through an aperture formed in the interior walls of rails 50 and 52 and engages the threads of L-shaped member 20. As set screw 62 is rotated it exerts a force on a spring member 30 which causes tabs 34 and 32 to exert a force urging rails 50 and 52 together and into firm embrace.

What is claimed is:

1. A corner framing fastener for fastening together a pair of framing rails forming a corner comprising:
   an L-shaped bottom spring member having a threaded aperture at the apex thereof;
   a top spring member having leg portions extending outward from an apex and forming an obtuse angle with respect to each other, each leg portion terminating in a curved end for engaging an end of said L-shaped member and a tab extending outward from each leg portion for each engaging a slot in one of said pair of framing rails forming a corner; and
   a screw member with one end thereof passing through said threaded aperture with said screw member engaging the threads thereof and said one end engaging the apex of said bottom spring member for exerting a force on the apex of said top spring member to urge that apex away from said bottom spring member and cause said tabs to engage said respective slots to pull said framing rails toward each other.

2. A fastener as in claim 1, wherein said screw member is a set screw.

3. In combination:

a pair of framing rails forming a corner, each having interior and exterior extending walls and a slot extending in each exterior wall at a distance from their intersection, and forming an aperture at the intersection of their interior extending walls defining a hollow space within bounded by the inner surfaces of said interior and exterior walls, an L-shaped bottom spring member having a threaded aperture at the apex thereof and with each leg extending along and contacting an inner surface of an interior wall of one of said rails;

a top spring member having leg portions extending outward from an apex and a tab extending outward from each leg portion engaging a slot; and a screw member passing through said aperture formed in said interior walls in said intersection and said threaded aperture and engaging the threads thereof and exerting a force on the apex of said top spring member to urge that apex away from said bottom spring member and cause said tabs to engage said respective slots to pull said framing rails toward each other.

* * * * *